Figure 1:
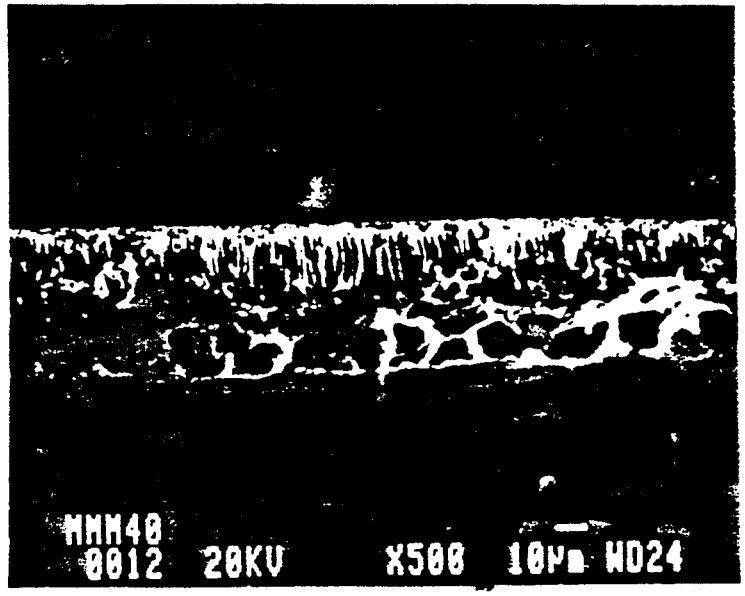

United States Patent [19]

Elmes et al.

[11] Patent Number: 5,288,547
[45] Date of Patent: Feb. 22, 1994

[54] TOUGHENED RESINS AND COMPOSITES

[75] Inventors: David A. Elmes, Gates Mills, Ohio; Marie A. Mullier, Bracknell, England

[73] Assignee: The British Petroleum Company p.l.c., London, United Kingdom

[21] Appl. No.: 824,642

[22] Filed: Jan. 23, 1992

[30] Foreign Application Priority Data

Jan. 25, 1991 [GB] United Kingdom ............... 9101691

[51] Int. Cl.$^5$ .................................................. B32B 5/14
[52] U.S. Cl. .................................. 428/308.4; 428/246; 428/273; 428/319.3
[58] Field of Search ............... 428/147, 327, 902, 332, 428/340, 308.4, 246, 273, 319.3; 156/60

[56] References Cited

U.S. PATENT DOCUMENTS

| 4,229,473 | 10/1980 | Elber ................................. | 428/113 |
| 4,784,901 | 11/1988 | Hatakeyama et al. ............. | 428/268 |
| 4,908,088 | 3/1990 | Boyd et al. ........................ | 156/307.3 |
| 4,954,195 | 9/1990 | Turpis ............................... | 156/242 |
| 4,957,801 | 9/1990 | Maranci et al. ................... | 428/147 |

FOREIGN PATENT DOCUMENTS

| 0274899 | 7/1988 | European Pat. Off. . |
| 0327142 | 8/1989 | European Pat. Off. . |
| 0337261 | 10/1989 | European Pat. Off. . |
| 0351028 | 1/1990 | European Pat. Off. . |
| 0366979 | 5/1990 | European Pat. Off. . |
| 63-097635 | 4/1988 | Japan . |
| 1320146 | 12/1989 | Japan . |
| 2203095 | 10/1988 | United Kingdom . |

Primary Examiner—George F. Lesmes
Assistant Examiner—Chris Raimund
Attorney, Agent, or Firm—Michael F. Esposito; David J. Untener

[57] ABSTRACT

A process for the preparation of a composite comprising reinforcing fibres embedded in a thermosetting resin matrix, the process comprising taking said fibres impregnated with said resin and curing said resin characterized in that a porous membrane film of thermoplastic material is placed between at least two layers of fibres prior to curing.

6 Claims, 1 Drawing Sheet

TOUGHENED RESINS AND COMPOSITES

The present invention relates to a method of preparing polymer composites which comprise a toughened resin incorporating a thermoplastic material.

Polymer composites must be tough so that they show adequate damage tolerance during service. An example is their ability to withstand impact events without loss of structural integrity. A test that can be used to assess the damage tolerance of a composite is to measure the damage produced by a specified impact event or to determine residual mechanical properties such as compression strength after the impact event.

Conventional resins such as thermosetting resins are used as matrix resins for polymer composites. Unfortunately, these resins are inherently brittle. This problem may be overcome by introducing a thermoplastic material into the resin. The resulting product is a toughened matrix material.

The thermoplastic may be introduced in four ways. The thermoplastic may be blended with the unreacted thermoset resin at elevated temperature to produce a single phase, unreacted melt. A limitation associated with this method is the level of thermoplastic that can be added to enhance toughness. As the high molecular weight thermoplastic dissolves into the resin, the viscosity of the blend rises steeply. This causes obvious difficulties in the impregnation of the resin blend into fibre bundles.

The thermoplastic may also take the form of a continuous solid film and may be placed between two layers of resin impregnated fibre. In such processes, the thermoplastic layer is generally known as the interleaf layer. Such processes are disclosed in the prior art and typically EP-A-0327142 discloses a composite which comprises a solid, continuous layer of a thermoplastic material placed between two layers of fibre impregnated with thermosetting resin. On heating, the thermosetting layers and the interleaf layers remain as discrete layers.

A problem often encountered with the aforementioned products is that the solid thermoplastic film does not dissolve into the resin during the heat processing stage. Although the final composite may show the desired increase in toughness, there is, however, a weak resin-thermoplastic interface. This weak interface between interlayer and matrix can cause poor resistance to cracking between plies, especially when exposed to a moist environment. To try and overcome this, EP-A-0366979 describes coating the interleaf film with an adhesive, GB-A-2203095 discloses the use of a corona discharge surface treatment to enhance adhesion and U.S. 4,908,088 discloses the use of a high temperature and high pressure calendering stage to encourage better bonding.

Some other attempts to reduce the problem of a weak interface have been made. Japanese Patent Application No. 01320146 and U.S. Pat. No. 4,229,473 disclose the use of a thermoplastic film which is provided with holes to allow the resin to pass from one side to the other. Additionally, Japanese Patent Application No. 63097635 discloses a thermoplastic layer having perforations; more specifically, the layer has 1-5 mm holes and a tensile rupture elongation of at least 90%. During curing, the aforementioned films remain as a discrete layer. The common point to all these inventions is that the interleaf remains as a discrete layer after heat processing to form the final composite.

The thermoplastic material may be introduced in the powdered form. An example of this technique is the basis of EP-A-0274899 where the thermoplastic material is ground to an average particle size of 15 m and either added to the resin before the prepreg is prepared or sprinkled onto the prepreg surface. A third method where a coating of powder and uncured resin is applied to the prepreg is also mentioned. A similar example is disclosed in EP-A-0351028 where ground particles are added at the interlayer to maintain the spacing between layers and in EP-A-0337261 where the interleaf is prepared by spraying a dispersion of powdered thermoplastic onto the prepreg or backing material. The common feature to these systems is that the powder remains as a separate phase in the cured composite, the thermoplastic does not dissolve.

Furthermore, U.S. Pat. No. 4,954,195 discloses a process for increasing damage tolerance in composites by controlled solubility of a thermoplastic filler. The thermoplastic material is introduced in the particulate form, the particles ranging from 10 to 80 $\mu$m. On heating, the thermoplastic dissolves into the resin resulting in a toughened resin material which has no definable boundaries between the two materials.

The aforementioned method using fine powders presents a problem. It is difficult to ensure that an even distribution of powder is applied to the resin. This is particularly the case with the levels of thermoplastic conventionally used (typically <25 g/m$^2$). Furthermore, there also exists the problem of the formation of agglomorates, which again results in an uneven distribution of the thermoplastic material in the resin. In addition, grinding the polymer to particles of a small enough size to allow dissolution is not simple and significant amounts of material may be lost during this stage.

Alternatively, layers of adhesive material may be placed between the layers of resin impregnated fibre. In many cases, this adhesive material is as thick as the resin impregnated fibre layers (for example: Optimal Use of Adhesive Layers in Reducing Impact Damage in Composite Laminates, S. Rechak & C. T. Sun, Journal of Reinforced Plastics & Composites (9), 1990, 569-582). This has the disadvantage that the overall level of load bearing carbon or glass fibres is greatly reduced by the presence of such adhesive layers and so laminate mechanical properties are reduced. In other methods, the adhesive is sprayed onto the resin impregnated fibre layers (for example: Fracture Behaviour of Interleaved Fibre-Resin Composites, S. F. Chen & B. Z. Jang, Composites Science & Technology (41), 1991. 77-97). The adhesives used in all these methods are typically a blend of uncured thermoset resin and an elastomer such as rubber. While toughness at ambient temperatures can be increased by the use of rubber containing compounds, the properties of the composites at higher temperatures and in moist environments suffer from its addition.

We have now found a method of incorporating the thermoplastic into the resin which overcomes the aforementioned problems. Accordingly, the invention is a process for the preparation of a composite comprising reinforcing fibres embedded in a thermosetting resin matrix, said process comprising taking said fibres impregnated with said resin and curing said resin; characterized in that a porous membrane film of thermoplastic material is placed between at least two layers of fibres prior to curing.

The thermoplastic material is introduced into the matrix as a porous membrane film. For the purposes of the present invention, a porous membrane film is defined as a porous polymeric film, the pores of which are interconnected.

Such membrane films allow enhanced control of the distribution and concentration of the thermoplastic material whilst enabling the thermoplastic to dissolve into the resin matrix with greater ease than alternative systems. Furthermore, the membrane structure has the advantage of a large surface area and a higher resin permeability than either solid films or powders. Damage to a composite material can often result in the formation of cracks in the interply region. Therefore, by providing a means of incorporating the toughened thermoplastic material in this region maximum benefit in improving damage tolerance is derived.

Membranes contain an interconnected network of pores with a high surface area which allows greater dissolution of the thermoplastic material, thus providing a single melt phase during curing. The single phase may persist to the fully cured composite. Alternatively, slight phase separation may occur, providing a fine phase separated structure. In both cases, the resulting composite shows enhanced toughness. Alternative methods such as powdered thermoplastic or solid films can result in undissolved material which has the effect of reducing toughness.

The membrane film has a high surface area which arises from a structure composed of a series of interconnected pores, providing high voidage. Suitably, the void volume of the membrane is 30-95% of the total membrane. By void volume is meant the ratio of the volume of voids to the total volume of the membrane.

Membranes with a wide variety of pore structures including both symmetric or asymmetric pore structures are suitable for this invention. The membrane film may be of any suitable dimension. Suitably, it is 1-500 $\mu$m thick, preferably 5-50 $\mu$m thick.

The membrane film is made from a thermoplastic material. For the purposes of the present invention, a thermoplastic material is a plastic which can be resoftened to its original condition by the action of heat. Any suitable thermoplastic material may be used in the process of the present invention e.g. polyesters, polyamides, polyaramids, polyarylates, polycarbonates, poly(ester-carbonate), polybenzimidazoles, polyimides, polyetherimides, polyetherketones, polyarylene-ethers, polysulphones and polyamideimides. Mixtures of two or more thermoplastic materials may also be used.

The membrane may be prepared by any suitable method such as phase precipitation processes which include immersion, evaporative, thermal and humidity methods. Alternatively, the membrane film may be prepared by track etching or mechanical stretching methods as well as by forming the structure from a monomeric material and then polymerising. Details of the aforementioned methods can be found in the textbook "Synthetic Polymeric Membranes" by R. E. Kesting, Wiley, N.Y., 1985. The preferred method of preparation is the conventional immersion-precipitation method.

The thermosetting resin of the present invention may be any suitable resin which is compatible with the thermoplastic material. By thermosetting resin, is meant a resin which when heated solidifies and cannot be subsequently resoftened to its original condition by the action of heat. The thermosetting resin may be selected from epoxy resins, polyimides, cyanate esters, phenolics, bismaleimides and acetylene-terminated resins such as acetylene terminated polysulphones. Also possible are polystyryl pyridines and polybenzimidazoles.

The thermosetting resin may suitably contain a curing agent. If the thermosetting resin is an epoxy resin, suitable curing agents for the purposes of this invention include diamines and anhydrides. Examples of such compounds are diethylenetriamine, triethylenetetraamine, tetraethylenepentaamine, dicyanodiamide, methylenedianiline, phenylenediamine, diaminodiphenylsulphone, bisaniline A, bisaniline P, bisaniline M, phthalic anhydride, maleic anhydride, succinic anhydride and benzophenone-tetracarboxylic dianhydride.

The amount of curing agent will of course vary with respect to the selected thermosetting resin and the curing temperature. For a given thermosetting resin, consideration of the stoichiometry of the reaction between the resin and the curing agent will determine the amount of the latter that is added. The thermosetting resin itself may also contain a small concentration of thermoplastic material, typically less than 20%.

The reinforcing fibres of the present invention may be selected from a range of fibres including carbon, glass, boron, silicon carbide, aromatic polyamide (aramid) and polyethylene fibres. The preferred fibre is a carbon fibre. The fibres may be purchased in the sized or unsized form.

The porous membrane film may be incorporated into the composite in a number of ways. If the composite is to be prepared from sheets of resin impregnated fibres ("prepreg"), then the membrane may either be incorporated within the prepreg during its preparation, applied to the prepreg after its preparation or placed between layers of prepreg during lay-up of the composite. Alternatively, the membrane may be placed between two layers of dry fibers in a mould and liquid resin injected into the mould. The latter process is known as resin transfer moulding.

Where a method using prepreg is adopted, the prepreg may be prepared by any conventional method well known in the art. For example, the hot-melt process may be used where a sheet of parallel fibres or a sheet of fabric prepared from woven fibres is immersed in a melt of the resin. The melt of the resin may be achieved by maintaining the resin at a suitable temperature, typically above ambient temperature but lower than that required to initiate curing of the resin. Also possible, is the solution process in which a sheet of parallel fibres or a sheet of fabric prepared from woven fibres is immersed in a solution of the resin in an appropriate solvent. The sheet is then taken out of the resin solution to partially or completely remove the solvent.

Alternatively, the porous membrane film may be placed on a sheet which has been coated with the thermosetting resin. Such coated sheets with membranes may be attached to both sides of a sheet of parallel fibres or woven fibres. Heat and pressure is then applied to the layered body between impregnating rollers to allow the resin and membrane to be transferred from the sheet into the fibres. Similar to this, the membrane may be applied to a sheet before coating the resin onto the membrane surface. Attachment to the fibres is by the same method.

According to the present invention there is also provided a precursor for a composite material which comprises a porous membrane film of thermoplastic material incorporated between at least two layers of thermosetting resin impregnated fibres.

The desired composite material may be prepared by stacking the resin impregnated fibre sheets in an appropriate order. Whether sheets of resin impregnated fibres incorporating the porous membrane films are used or membranes are added during the stacking process, the layered body may be placed in an autoclave or press.

The curing temperature will of course be determined by the choice of thermosetting resin but if, for example, an epoxy system is used, the curing temperature may be suitably in the range of from 150°-250° C., preferably 170°-200° C.

The invention will now be described in detail with reference to the following examples.

Preparation of the Membrane

The membrane was prepared according to conventional immersion precipitation methods familiar to those skilled in the art.

Portions of a thermoplastic polyimide (Matrimid 5218 (Trade Mark)) were dissolved in a solvent (N-methyl pyrrolidone, NMP) to give two solutions of concentration 7.0 wt % and 8.75 wt % polymer. The resulting solutions were filtered and used to prepare membranes of two different grammages (weight per unit area, $g/m^2$).

To prepare the membranes, a thin film of the solution was cast onto a polyester film and the film was then immersed in a bath of non solvent (isopropyl alcohol, IPA). The membrane structure forms rapidly, within a minute, typically within 10 seconds. The membrane is left in the non solvent bath for 2-3 minutes then transferred to a water bath to remove the IPA and remaining NMP. Several washes of clean water may be used to assist IPA and NMP removal. The membrane is then removed from the water bath. The polyester sheet is removed and the membrane is placed on absorbent paper and left to dry in air. Drying at elevated temperatures and reduced pressures in a vacuum oven can be used to reduce the drying time.

Figure 2:
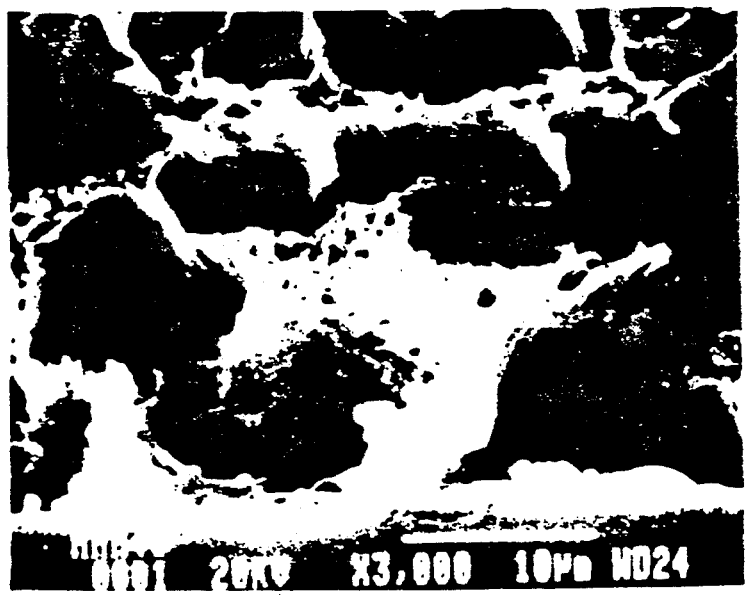

Use of the two different solution concentrations gave membranes with grammages of 7.9 $g/m^2$ and 16.8 $g/m^2$ respectively. The porous structure was verified by examination of the membrane cross section and surfaces in a scanning electron microscope. To prepare cross sections without damaging the structure, specimens were freeze fractured. This is a technique where the membrane is supported on a substrate such as a metallographic mounting resin, immersed in liquid nitrogen then removed and fractured while still at low temperature. FIGS. 1 and 2 show a scanning electron micrograph of the membrane. FIGS. 1 and 2 are side sectional views of the membrane, FIG. 2 being an enlargement. In both Figures the dark areas are the voids or pores and the light areas are the thermoplastic resin.

Preparation of Resin Impregnated Fibre (Prepreg)

The prepreg was prepared by the process mentioned earlier where a film of resin is laid down on sheets of backing paper. Two such coated sheets are then sandwiched on either side of a layer of carbon fibres with the resin in contact with the fibres. Heat and pressure are subsequently used to cause the resin to impregnate the fibre layer. This method and the equipment required will be familiar to those skilled in the art.

A blend of Epiclon 830 epoxy resin from DIC, and ERL 0510 epoxy resin from Ciba Geigy was preheated to approximately 55° C. The weight percents of these two epoxies and subsequent material are given in the table below.

|  | wt % in Blend |
| --- | --- |
| Epiclon 830 | 33.90 |
| ERL 0510 | 29.20 |
| 3,3'-DDS | 27.15 |
| Matrimid 5218 | 9.25 |
| CoAcAc | 0.50 |

Epiclon 830 - diglycidyl ether of bisphenol F
ERL 0510 - trifunctional epoxy, based on p-aminophenol
3,3'-DDS - 3,3'-diamino diphenyl sulphone
Matrimid 5218 - reaction product of 3,3',4,4'-benzophenone tetracarboxylic dianhydride and 5-amino-1-(4 amino phenyl)-1,3,3-trimethyl indane.
CoAcAc - Cobalt (III) acetylacetonate To the blend at 55° C., micropulverised Matrimid 5218 polyimide thermoplastic from Ciba Geigy was added. The blend was kept at 55° C. under constant mixing. Subsequently the 3,3'-DDS curing agent was added and the temperature raised to 66°-71° C. The blend was kept at this temperature for 5 minutes while mixing, the CoAcAc being added at this stage. The blend was then degassed while it was maintained at 66°-71° C. This resin was then used to prepare the prepreg in the manner described above. The fibre was carbon fibre grade IM7, 12K from Hercules Inc. Two batches of prepreg with different resin content were prepared, one for each of the two membranes with different grammages. The resin content of the prepreg is defined as follows:

$$\text{Resin content of prepreg (wt \%)} = \frac{\text{Grammage of resin (g/m}^2\text{)}}{\text{Grammage of resin + grammage of fibre (g/m}^2\text{)}}$$

where the mass of resin includes any thermoplastic contained in the resin but not any added in the form of a porous membrane.

Preparation of Composites

Composites were prepared so as to compare the effect of adding a porous membrane on the damage tolerance of the composite and of using a membrane to vary the total level of thermoplastic in the matrix. The total level of thermoplastic in the matrix is defined as follows:

$$\text{Total thermoplastic content in matrix (wt \%)} = \frac{\text{Grammage of thermoplastic in resin (g/m}^2\text{) + Grammage of membrane (g/m}^2\text{)}}{\text{Grammage of resin + grammage of membrane}}$$

Where a membrane is added to the prepreg, the overall matrix content of the prepreg is higher than the resin content defined above. The matrix content of the prepreg is defined as follows:

$$\text{Matrix content of prepreg (wt \%)} = \frac{\text{grammage of resin + grammage of membrane (if any)}}{\text{grammage of resin + grammage of fibre + grammage of membrane (if any)}}$$

All measurements defined above are carried out in the uncured state.

Laminates were cured in an autoclave using vacuum bag procedures familiar to those skilled in the art; the cure cycle used was as follows:

Heat to 105° C. at 2° C./min with pressure within the bag at −0.95 bar absolute and whilst increasing external pressure to 5.8 bar at 2 bar/min approximately. Dwell 105° C. for 30 min. Heat from 105° C. to 175° C. at 2° C./min. Dwell 175° C. for 2 hr 15 min then cool to ambient at 2° C./min. When cooled to 50° C., release external pressure at 2 bar/min approximately and then vent vacuum bag to atmospheric pressure.

Details of Laminates and Testing

As mentioned earlier, porous membranes may be added during the preparation of prepreg or placed between sheets of prepared prepreg when the composite laminate is being laid up. In this example, both methods were evaluated.

Laminates prepared were either unidirectional $[0]_{24}$ or quasi-isotropic $[+45,0,-45,90]_{4S}$. In the unidirectional (UD) laminates, the membranes were interleaved during prepregging and these laminates were used to measure the critical strain energy release rate in mode II (forward shear), $G_{IIC}$ (J/m$^2$) by the end notch flexure test. This test is a measure of the toughness of the composite, details of which can be found in "Factors affecting the interlaminar fracture energy of graphite/epoxy laminates", A. J. Russell & K. N. Street, Progress in Science & Engineering of Composites, Eds T Hayashi et al, ICCM IV, Tokyo, 1982, p279.

The quasi-isotropic (QI) laminates were prepared by interleaving membranes between prepreg sheets during lay-up. They were then used to measure the post impact compression strength (PICS, ksi) after a standard 66.9 J/cm (1500 in-lb/in) impact event as outlined in the specification BMS-8-276, issue C of the Boeing Company.

Results

Post impact compression strength testing (PICS)

Details of quasi-isotropic laminates prepared and test results on two laminates are shown in the table below:

| | Prepreg details | | | | |
|---|---|---|---|---|---|
| No | Resin content (wt %) | Membrane grammage (g/m$^2$) | Matrix content (wt %) | Total TP in matrix (wt %) | PICS result (ksi) |
| 1 | 32.9 | none | 32.9 | 9.3 | 30.0 ± 0.9 |
| 2 | 32.9 | 7.9 | 35.5 | 18.3 | 41.7 ± 1.7 |

This shows that the addition of porous membranes causes a 39% rise in PICS

Damage area after impact

Quasi-isotropic laminates were impacted according to the specification BMS-8-276 and then the extent of internal damage measured by ultrasonic C-scan. Measurements were carried out on a Meccasonics standard immersion scanner using a 5 MHz probe. Laminates with (No 4) and without (No 3) membranes were assessed at the same attenuation settings to determine the area of the damage and the maximum diameter of the damaged area. The damage area is expressed as a percentage of the total laminate area.

| | Prepreg details | | | | | |
|---|---|---|---|---|---|---|
| No | Resin content (wt %) | Membrane grammage (g/m$^2$) | Matrix content (wt %) | Total TP in matrix (wt %) | Damage area (% of board) | Maximum Damage Diameter (mm) |
| 3 | 30.1 | none | 30.1 | 9.3 | 13.1 ± 0.4 | 107 ± 1 |
| 4 | 30.1 | 16.8 | 35.3 | 28.3 | 8.2 ± 0.2 | 37 ± 1 |

These results show that increasing toughness through the use of membranes has reduced the overall damage area by 37% and the maximum damage diameter by 65%. In laminates without membranes, the damage area is oval in shape but, with membranes, this is reduced to a smaller, circular damage zone. This explains why the reduction in maximum damage diameter is higher than that of the damage area.

Mode II critical strain energy release rate ($G_{IIC}$)

The unidirectional laminates (Nos 5 and 6) tested for $G_{IIC}$ are listed in the table below. When calculating $G_{IIC}$, the peak load and compliance associated with the peak load are used in the calculation.

| | Prepreg details | | | | |
|---|---|---|---|---|---|
| No | Resin content (wt %) | Membrane grammage (g/m$^2$) | Matrix content (wt %) | Total TP in matrix (wt %) | $G_{IIC}$ result (J/m$^2$) |
| 5 | 32.9 | 7.9 | 35.4 | 18.2 | 1128 ± 149 |
| 6 | 30.1 | 16.8 | 35.8 | 27.9 | 2023 ± 486 |

These results show that use of membranes to increase thermoplastic content increases $G_{IIC}$ by 79% even where the overall matrix content of the laminates is kept constant.

We claim:

1. A process for the preparation of a composite comprising reinforcing fibres embedded in a thermosetting resin matrix, said process comprising taking said fibres impregnated with said resin and curing said resin; characterized in that a porous membrane film of thermoplastic material selected from polyesters, polyamides, polyaramids, polyarylates, polycarbonates, poly(estercarbonates), polybenzimidazoles, polyimides, polyetherimides, polyetherketones, polyarylene ethers, polysulphones and polyamideimides is placed between at least two layers of fibres prior to curing.

2. A method according to claim 1 in which the porous membrane film has a void volume of 30–95%.

3. A method according to claim 1 in which the thermosetting resin is selected from epoxy resins, polyimides, cyanate esters, phenolics, bismaleimides, acetylene-terminated resins, polystyryl pyridines and polybenzimidazoles.

4. A method according to claim 1 in which the fibres are selected from carbon, glass, boron, silicon carbide, aromatic polyamide and polyethylene fibres.

5. A method according to claim 4 in which the fibres are carbon fibres.

6. A method according to claim 1 in which the layers are placed in an autoclave or press and cured at elevated temperature.

* * * * *